United States Patent
Pokolm

(10) Patent No.: US 8,690,490 B2
(45) Date of Patent: Apr. 8, 2014

(54) MILLING TOOL FOR MACHINING WORK PIECES

(76) Inventor: Franz Josef Pokolm, Harsewinkel (DE)

( * ) Notice: Subject to any disclaimer, the term of this patent is extended or adjusted under 35 U.S.C. 154(b) by 591 days.

(21) Appl. No.: 12/933,289

(22) PCT Filed: Mar. 17, 2009

(86) PCT No.: PCT/EP2009/053153
§ 371 (c)(1),
(2), (4) Date: Sep. 17, 2010

(87) PCT Pub. No.: WO2009/115526
PCT Pub. Date: Sep. 24, 2009

(65) Prior Publication Data
US 2011/0013997 A1    Jan. 20, 2011

(30) Foreign Application Priority Data

Mar. 18, 2008  (DE) ............... 20 2008 000 026 U
Nov. 5, 2008   (DE) ............... 20 2008 013 759 U

(51) Int. Cl.
*B23C 5/22*    (2006.01)

(52) U.S. Cl.
USPC ............................................. 407/7; 407/48

(58) Field of Classification Search
CPC ....................................................... B23B 27/12
USPC ................................ 407/7, 40, 48, 64, 65, 113
See application file for complete search history.

(56) References Cited

U.S. PATENT DOCUMENTS

| | | | | |
|---|---|---|---|---|
| 2,233,724 A * | 3/1941 | Bannister et al. | ............ | 407/7 |
| 2,885,766 A * | 5/1959 | Ernst et al. | ............ | 407/7 |
| 2,908,203 A * | 10/1959 | Persson | ............ | 409/303 |
| 3,329,065 A * | 7/1967 | Vaughn | ............ | 409/232 |
| 3,341,920 A * | 9/1967 | Kelm | ............ | 407/104 |
| 3,515,029 A * | 6/1970 | Gambini | ............ | 409/138 |
| 4,378,184 A * | 3/1983 | Briese | ............ | 407/113 |
| 4,963,061 A * | 10/1990 | Katbi et al. | ............ | 407/114 |
| 5,022,795 A * | 6/1991 | Stampfli et al. | ............ | 407/47 |
| 5,035,544 A * | 7/1991 | Ikenaga et al. | ............ | 407/105 |
| 5,333,938 A * | 8/1994 | Gale | ............ | 299/106 |
| 5,423,719 A * | 6/1995 | Jennings | ............ | 451/540 |
| 5,597,270 A * | 1/1997 | Marin | ............ | 407/102 |
| 6,073,524 A * | 6/2000 | Weiss et al. | ............ | 82/1.11 |
| 2003/0119319 A1 * | 6/2003 | Sinha et al. | ............ | 438/691 |
| 2008/0232909 A1 * | 9/2008 | Filho et al. | ............ | 407/7 |
| 2009/0175695 A1 * | 7/2009 | Endres et al. | ............ | 407/113 |

FOREIGN PATENT DOCUMENTS

| | | | | | |
|---|---|---|---|---|---|
| JP | 05-228716 A | * | 9/1993 | ............ | B23C 5/20 |
| JP | 07-051905 A | * | 2/1995 | ............ | B23B 27/12 |

(Continued)

*Primary Examiner* — Daniel Howell
*Assistant Examiner* — Ryan Rufo
(74) *Attorney, Agent, or Firm* — Cohen & Grigsby, PC

(57) ABSTRACT

The invention related to a milling tool (1) for machining work pieces, comprising at least one blade that is arranged in a radial manner on the milling head (2) that is rotationally mounted on a rotationally symmetrical designed Y-axis (4) on the milling head. According to the invention, said indexable cutting insert (2) is arranged below a tolerance play (7) in a freely rotating manner on the free end (8) of a mounting pin (9) secured in a detachable manner to the milling head (3) below the clamping seat. The freely rotationally mounted indexable cutting insert (2) is mounted or surrounded on the entire surface of the rear side (10) and on certain pats on the front side (11) such that the mounting pin (9) does not detach itself from the material (12) of the milling head (3).

8 Claims, 12 Drawing Sheets

(56) References Cited

FOREIGN PATENT DOCUMENTS

| | | | | |
|---|---|---|---|---|
| JP | 07-185903 | * | 7/1995 | .............. B23B 27/12 |
| JP | 08-229706 | * | 9/1996 | .............. B23B 27/12 |
| JP | 08-229706 A | * | 9/1996 | .............. B23B 27/12 |
| JP | 10-118802 A | * | 5/1998 | .............. B23B 27/12 |
| JP | 2001-353602 | * | 12/2001 | .............. B23B 27/12 |
| SU | 965634 A | * | 10/1982 | ................ B23C 5/06 |

* cited by examiner

MILLING TOOL FOR MACHINING WORK PIECES

BACKGROUND OF THE INVENTION

The invention relates to a milling tool for machining work pieces comprising at least one blade disposed on the milling head, said blade being in the form of an indexable cutting insert rotatably mounted on a radially rotation-symmetrically designed Y axis on the milling head.

PRIOR ART

Machining with rotating blades has been a well known procedure for years though the procedure has obtained distinctiveness in manufacture to only a small degree. In the present case, a tool is used the active element whereof comprises a round, rotatably mounted disk blade, said disk blade executing during the machining process an automatic rotational movement kinematicly-based on the machining process and on the fact that the disk blade axis is slanted in relation to the cutting direction. Due to the said rotating movement of the disk blade during machining, a new part of the blade is always engaged in continuous sequence, whereby each point on the blade remains only briefly in the cutting zone, which causes only slight heating of the disk blade.

A corresponding milling cutter here is known, for example, from the patent application DD 118 543. In this embodiment, not only a rotating rotary disk, but also a fixed blade is provided on the milling head, in order to in this way achieve a particular cutting design. A further embodiment of the prior art is also known from the U.S. Pat. No. 2,885,766, wherein indexable cutting inserts rotatably mounted in the milling head are provided, said indexable cutting inserts being mounted rotatably on rotation-symmetrically designed axes on the milling head. With this milling head known from the prior art, the rotatably mounted indexable cutting inserts are disposed in U-shaped nests so that the axes are, in particular, embedded on both sides in the milling head.

In addition, further embodiments are known to the art such as, for example, are described in the U.S. Pat. No. 5,478,175. This publication discloses a rotatable blade equipped with a shank formed integrally to the rear side thereof, said shank being rotatably mounted in a pocket hole bore in the carrier material of the milling head. An equivalent solution is also known to the art from the patent application DE 10 2005 051 695, wherein, in particular, the indexable cutting insert is attached to a carrier element and wherein the carrier element is rotatably held in the tool. In this case, the carrier element is equipped coaxially to the Y axis with a shaft end rotatably disposed in a pocket hole bore in the tool. In this embodiment known according to the prior art, in particular, the carrier element provided here may also be designed as actively turn-actuated so that, due to the rotational movement of the milling tool, the cutting insert attached to the carrier here is also driven by a transmission gear provided in the milling head. A corresponding embodiment is also described in the patent application CH 480 120.

With the said solutions for milling tools known from the prior art which are equipped with rotatably mounted cutting disks, it is considered as disadvantageous that the embodiments known to the art are very costly to build with regard to their rotatably mounted indexable cutting inserts, which is due to the costly design of the mounting for the indexable cutting insert. Thus, for example, all solutions known from the prior art have in common that, in particular, in order to exchange the indexable cutting insert, though rotatably mounted, the execution of several operations on the milling head is necessary to on the one hand, detach the indexable cutting insert out of the milling head and on the other hand, after detaching the carrier means, the indexable cutting insert still has to be detached from the carrier means itself. An additional disadvantage of the solutions known to the art is seen in the fact that in particular with regard to the storage inventory of rotatably mounted indexable cutting inserts, indexable cutting inserts particularly adapted to the milling head have to be kept available in storage.

SUMMARY OF THE INVENTION

Object

The invention therefore has the object of developing a milling head for machining work pieces comprising radially disposed, rotatably mounted indexable cutting inserts in such a way that the embedment for mounting the blades becomes substantially simpler and, in particular, the process of exchanging the cutting inserts becomes substantially simpler.

Solution

According to the invention, the object is achieved with the features of claim 1, and advantageous embodiments of the invention ensue from the sub-claims.

The advantages obtained with the invention, in particular, include the fact that as a consequence of a pin solution in conjunction with the envelopment of the rotating indexable cutting insert by the carrier material of the milling head, an indexable cutting insert rotating in a cage is created, said indexable cutting insert having sufficient motion freedom and/or rotational freedom to on the one hand, penetrate the material during the drilling process and on the other hand, be able to remove a corresponding chip during machining. The simple embedment of the indexable cutting insert here is only achieved by the shape of the milling head in conjunction with the mounting pin. Thereby it is guaranteed that the rotating disk has, in particular during machining, sufficient rotational freedom without incurring the risk that the blades might separate from their mountings by themselves.

The indexable cutting insert here is disposed freely rotatably under a tolerance play on the free end of a mounting pin, said mounting pin being detachably attached with braced seating to the milling head, and the freely rotatably mounted indexable cutting insert is enveloped by and/or embedded in the material of the milling head, on the one hand on the entire surface of the rear side and on the other hand, on parts of the frontal side in a way to prevent a self-detachment from the mounting pin. Due to the detachably attached mounting pin forming the rotational axis for the indexable cutting insert, it is guaranteed that by simply detaching the mounting pin, the indexable cutting insert is released within the cage thereof so that it is possible to simply remove the indexable cutting insert from its nest or allow the same to drop therefrom. For this purpose, the mounting pin is disposed in a penetrating bore on the milling head. It is now easily understood that the mounting pin can easily be pushed through from one side so that, in particular, the mounting pin releases the indexable cutting insert from its seat and allows it to be removed from the nest.

In a development of the invention, the mounting pin has a frontal cylindrical area for the rotational mounting of the indexable cutting insert, as well as a rear, conically mounted area for the fixation to the carrier material of the milling head. Thus it is guaranteed that on the one hand, the pin, forming a rigid mounting axis as its free end, is held in the material of the milling head by adhesion forces. On the other hand, the frontal cylindrical area of the mounting pin, in particular, forms a kind of sliding mounting surface for the indexable cutting insert.

In a development of the invention, the mounting pin may be equipped with a central tapped hole in the rear, conically designed area. The said tapped hole may also, in particular, be used, for example, to brace the mounting pin in the penetrating bore and/or also to, for example, connect a tool in order to use the said tool to pound the mounting pin out of the seat thereof. In a development of the invention, the mounting pin functions in the rear, conically designed area in conjunction with the conicity provided in the bore. Thus a positive-locking snug fit in the carrier material of the milling head is achieved.

According to a particularly advantageous embodiment of the invention, the mounting pin may also be provided in a way to be designed as a screw with the frontal area of the shank thereof being designed cylindrically in order to form the mounting for the indexable cutting insert, while the cylindrical area engages in the bore and is supported therein. The cylindrical area of the screw shank here reaches into the milling head material and is screwed down and thereby braced against a stop so that the screw designed as mounting pin forms a rigid mounting axis in the milling head material. The frontal shank area of the screw thus forms a cylindrical sliding mounting axis in the same way as described.

The central bore for the rotational mounting of the indexable cutting insert here may be a pocket hole bore. Thus it is guaranteed that the indexable cutting insert presents itself closed in the frontal area so that thereby the mounting holding device is completely surrounded by the indexable cutting insert. In order to, in particular, simplify the detachment of the mounting pin, it may also be provided that the indexable cutting insert for the purpose of the rotational mounting be equipped with a cylindrical pocket hole bore with a central opening where a tool can be inserted for pushing the mounting pin out.

In a development of the indexable cutting inserts, these may be equipped with a chip trough on the frontal side thereof. The chip troughs here may be provided on the frontal side as well as on the rear side. For the purpose of promoting the kinematics-based automatic rotational movement of the indexable cutting inserts, the rotation-symmetrically designed Y axis is provided in a way to run on a slant on the milling head. This slant here may either have a small positive inclination, or a small negative inclination relative to the X axis.

According to a particularly advantageous embodiment of the invention, instead of the enveloping milling tool material, the indexable cutting insert may from the frontal side thereof, work in conjunction with a holding element. Here the freely rotatably mounted indexable cutting insert, in order to prevent a self-detachment from the mounting pin, is enveloped by the milling cutter material, on the one hand on the entire surface of the rear side and on the other hand, on the frontal side by means of a holding element provided on the milling head. The holding element comprises a screw, the screw head whereof forms a frontal support area for the rotatably mounted indexable cutting insert.

According to an advantageous development of the invention, as a consequence of a pin solution in conjunction with the envelopment of the rotating indexable cutting insert by the carrier material of the milling head, a rotating indexable cutting insert is achieved, said indexable cutting insert having sufficient motion freedom and/or rotational freedom to on the one hand, penetrate into the material during the drilling process and on the other hand, be able to remove a corresponding chip during machining. The simple embedment of the indexable cutting insert here is achieved solely by the accordingly shaped milling head in conjunction with the mounting pin. Thus it is guaranteed that the rotating disk has, in particular for machining, sufficient rotational freedom without incurring the risk that the blades might separate from the mountings by themselves.

The indexable cutting insert here is disposed freely rotatably under a tolerance play on the free end of a mounting pin, said mounting pin being detachably attached with braced seating to a milling head, and the freely rotatably mounted indexable cutting insert is secured against a self-detachment from the mounting pin by the positive lock between the free end of the mounting pin and the mounting seat of the indexable cutting insert. This design guarantees a freely rotatable indexable cutting insert held on the mounting pin exclusively by the positive lock. The positive lock between the free end of the mounting pin and the mounting itself of the indexable cutting insert here is designed conically. Based on this development, the installation and/or the insertion of the indexable cutting insert are extremely simple. When the mounting pin is screwed out, the indexable cutting insert can be removed from the mounting pin. The positively locked mounting here extends in such a way that the conical positively locked connection preferably extends over approximately half of the free end of the mounting pin and/or the mounting seat of the indexable cutting insert.

According to a suitable development, the free end of the mounting pin is equipped with a cylindrical area for the rotational mounting of the indexable cutting insert, onto which cylindrical area abuts a further conically designed area for the fixation as well as centring in the carrier material of the milling head. This guarantees that the mounting pin always has a centred seat in the milling head material. In a development of the invention, the mounting pin is designed in the rear area as a screw for bracing and fixation in the carrier material of the milling head. The indexable cutting insert itself is equipped with a conical bore for the rotational mounting, onto which conical bore abuts a cylindrical area. The conical area and the cylindrical area are coordinated with the conicity as well as with the cylindrical area of the mounting pin. According to an advantageous development of the invention, the indexable cutting insert is equipped with a chip trough on its frontal side.

According to a particularly advantageous development of the invention, for the purpose of the further formation of the cage for the rotating indexable cutting insert, said indexable cutting insert on the one hand is surrounded by the material of the milling head on the rear side, while on the other hand, the cage can be completed on the frontal side by means of a holding element provided on the milling head. The holding element here comprises a plate attached to the milling head by means of fastening means, preferably a screw, while one area of the plate protrudes over the frontal side of the indexable cutting insert. In a development, the plate is in an advantageous manner preferably placed into and/or disposed in a cavity provided on the milling head. This results, in particular, in a dimensionally stable position of the holding element forming the cage.

BRIEF DESCRIPTION OF THE DRAWINGS

An embodiment of the invention is represented in more detail with reference to the FIGS. 1 through 15 listed below. The drawings show in FIG. 1: an initial embodiment of a milling tool according to the invention, where the milling cutter is represented in a lateral view a, in a perspective view b, in a top view c, in a sectional lateral view d, as well as in a detail view e.

BEST WAY OF CARRYING OUT THE INVENTION

Figure 1A:
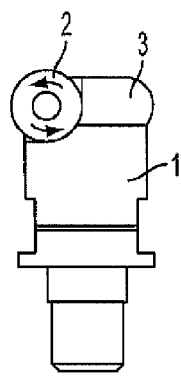
Figure 1B:
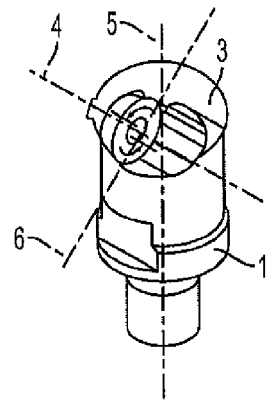
Figure 1C:
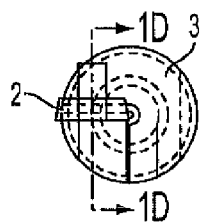
Figure 1D:
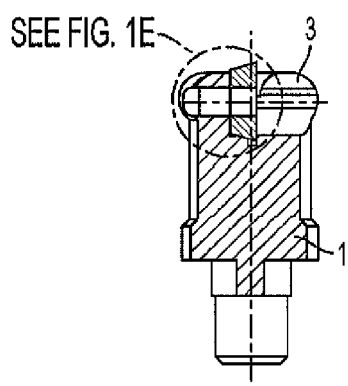

FIG. 1 shows an initial embodiment of a milling tool 1 according to the invention, wherein the milling tool 1 can be seen once in each detail view, in the lateral view a, in the perspective view b, in the top view c, as well as in the sectional exposed view d. The detail view e, in particular, shows the arrangement of an indexable cutting insert 2 on the milling head 3 in sectional exposed representation. The milling tool 1 here is intended to machine work pieces, and at least one radially disposed indexable cutting insert 2 is provided on the milling head 3 of the milling tool 1, said indexable cutting insert 2 being rotatably mounted on a rotational-symmetrically designed Y axis 4 on the milling head 2. As can be seen, in particular, from the perspective representation of FIG. 1b, the Z axis in particular forms the rotational axis 5 of the milling tool 1, while the X axis occupies the cutting horizon designated by the reference number 6.

It is now easily understood that the Y axis 4 is provided rotation-symmetrically on the milling head 3 and runs at an offset to the rotational axis 5. As can be seen, in particular, from the overall representation of FIGS. 1c, d, and e, the indexable cutting insert 2 is freely rotatably disposed under a tolerance play 7 on the free end 8 of a mounting pin 9, said mounting pin 9 being detachably attached with braced seating to the milling head 3. The freely rotatably mounted indexable cutting insert 2 here is secured against a self-detachment from the mounting pin 9 in such a way that said indexable cutting insert 2 is enveloped and/or surrounded by the material of the milling head 2, on the one hand on the entire surface of the rear side 10 and on the other hand, in parts on the frontal side 11. This can be seen, in particular, from the view of FIG. 1a, where it becomes clear that one area of the frontal side 11 of the indexable cutting insert 2 is overlapped by the material 12 of the milling head 3. A corresponding situation can be seen also in the sectional view of FIG. 1e, where in particular the lower section 13 of the milling head material 12 protrudes over the frontal side 11 of the indexable cutting insert 2.

Figure 1E:
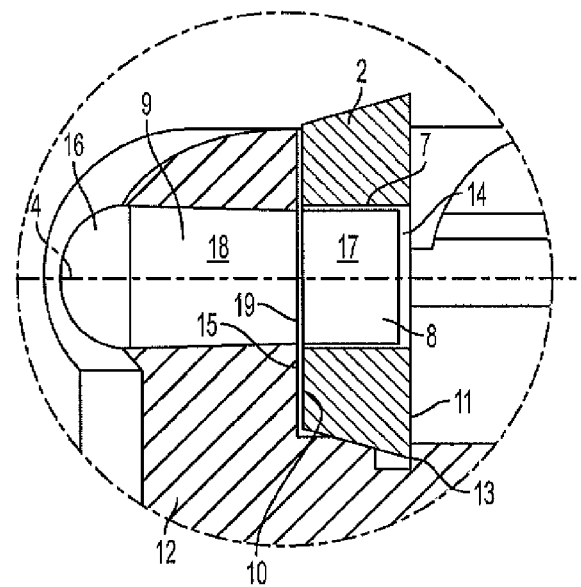
Figure 2A:
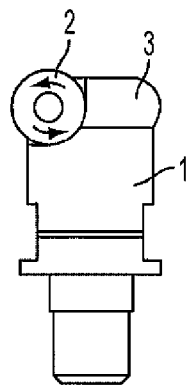
FIG. 2: a further embodiment according to FIG. 1 in similar manner, also in detail views a through e.
Figure 2B:
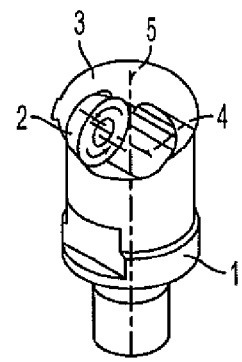
Figure 2C:
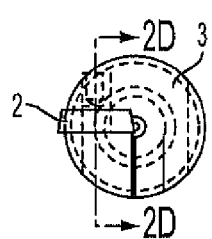
Figure 2D:
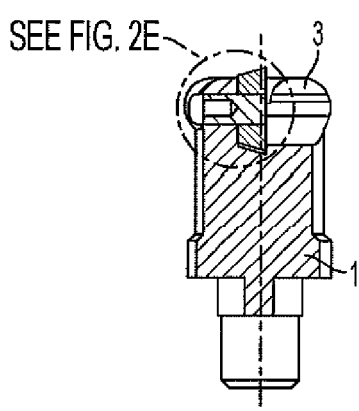
Figure 2E:
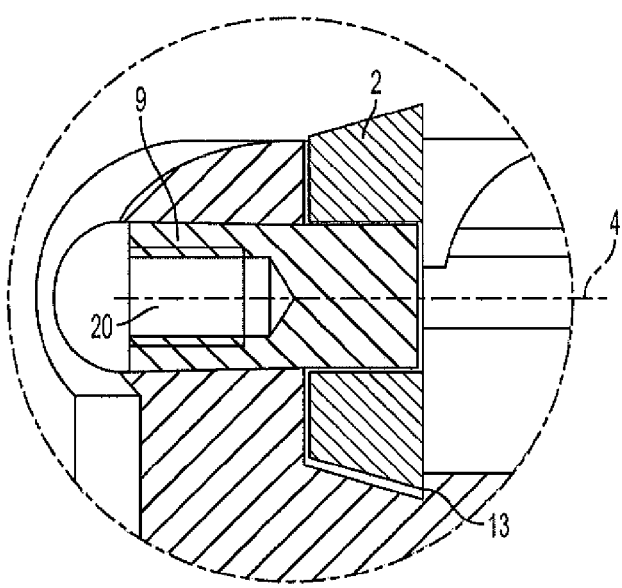
Figure 3A:
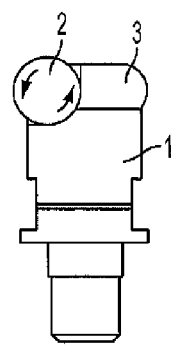
FIG. 3: a further embodiment according to FIG. 1, also in detail views a through e.
Figure 3B:
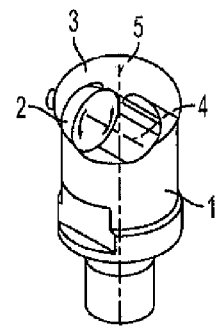
Figure 3C:
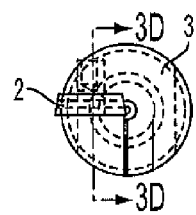
Figure 3D:
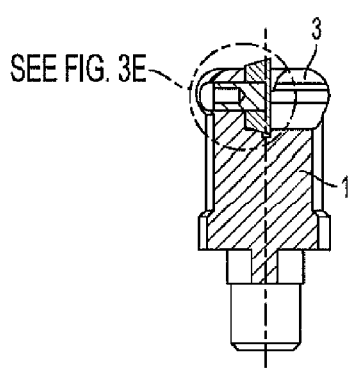
Figure 3E:
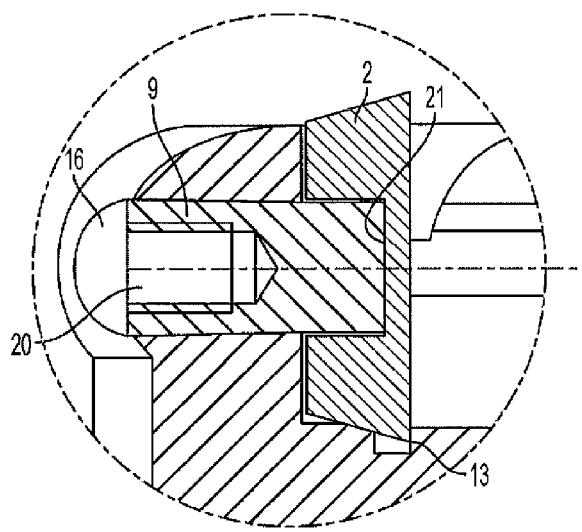
Figure 4A:
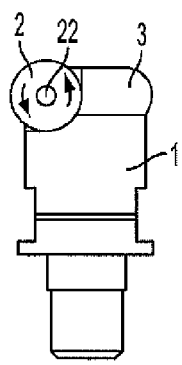
FIG. 4: a further embodiment according to FIG. 1, also in detail views a through e.
Figure 4B:
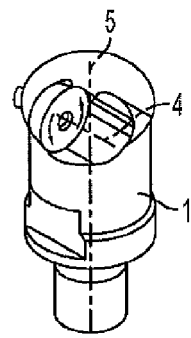
Figure 4C:
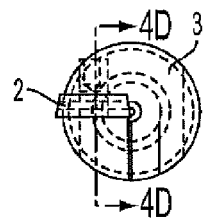
Figure 4D:
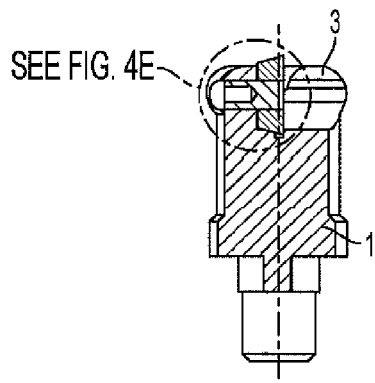
Figure 4E:
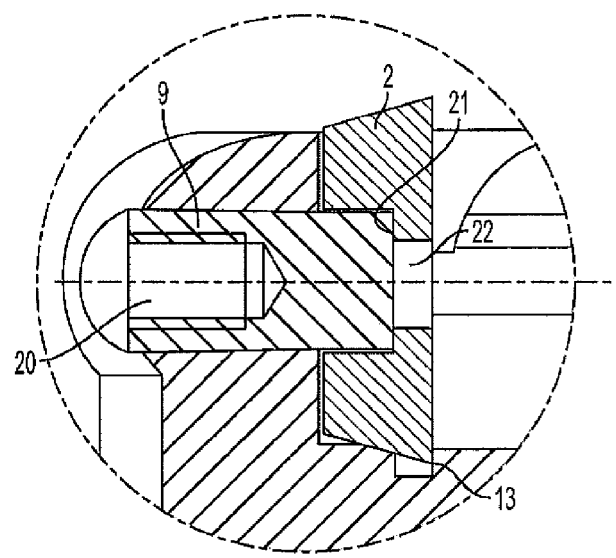
Figure 5A:
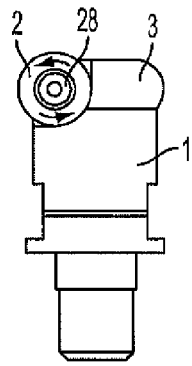
FIG. 5: a further embodiment according to FIG. 1, also in the detail views a through e with a mounting pin designed as screw.
Figure 5B:
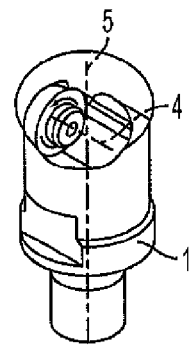
Figure 5C:
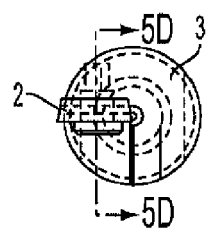
Figure 5D:
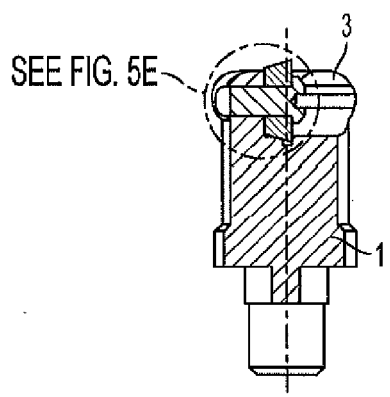
Figure 5E:
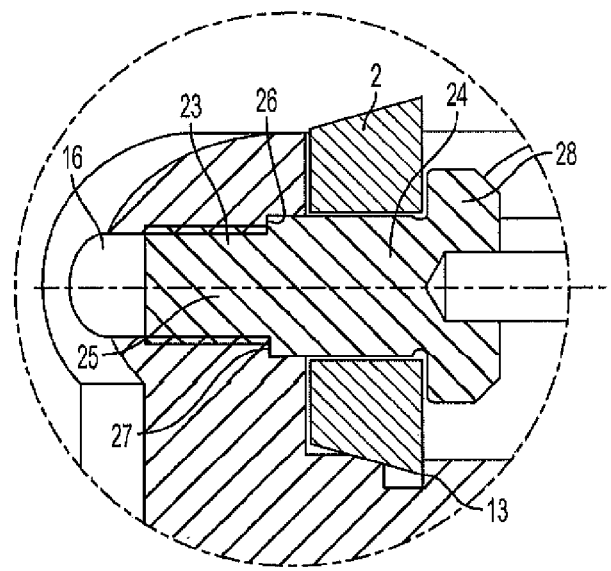
Figure 6A:
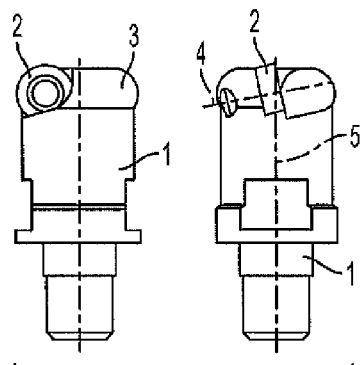
FIG. 6: a milling tool according to the invention with a negative inclination of the pin axis, also in the detail views a through e.
Figure 6B:
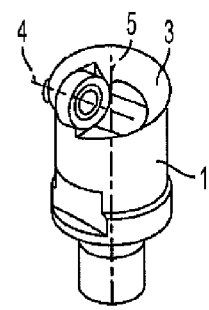
Figure 6C:
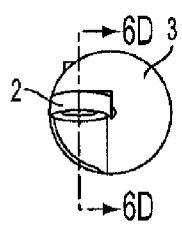
Figure 6D:
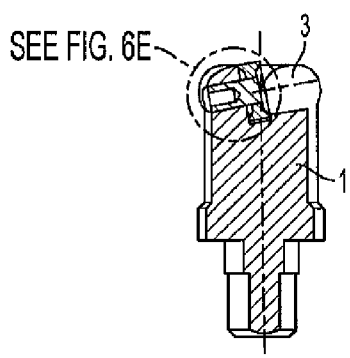
Figure 6E:
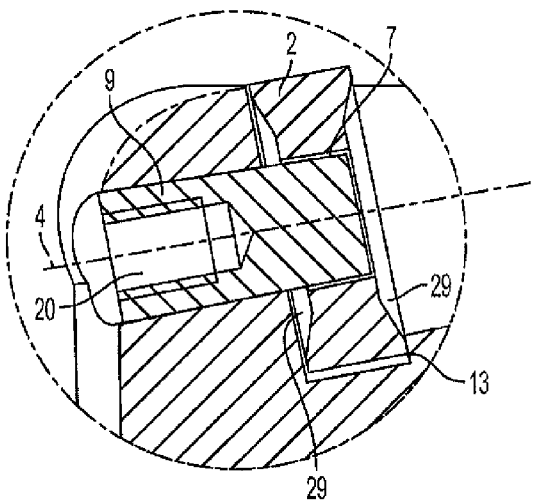
Figure 7A:
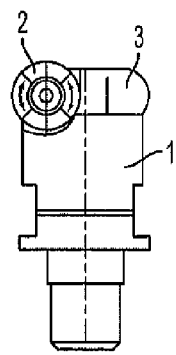
FIG. 7: a further embodiment according to FIG. 6, also in the detail views a through e, with a positive inclination of the pin axis.
Figure 7B:
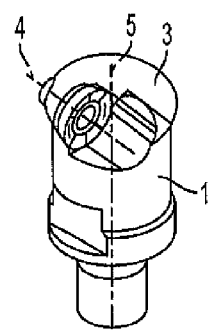
Figure 7C:
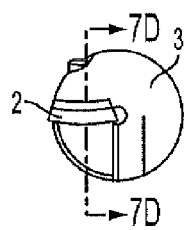
Figure 7E:
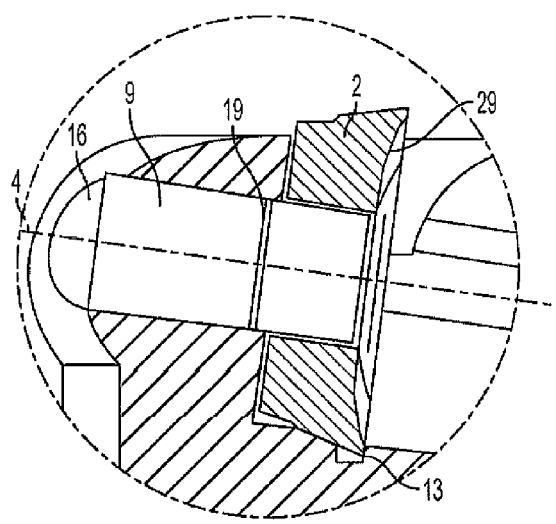
Figure 7D:
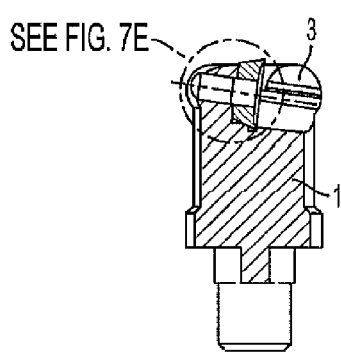
Figure 8A:
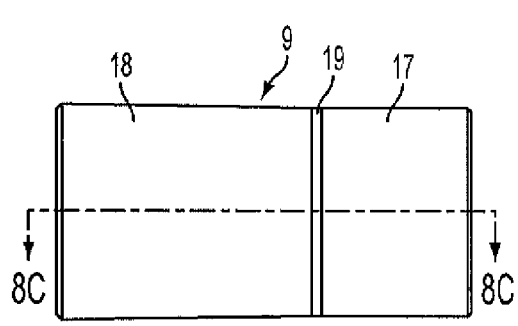
FIG. 8: a component view of the mounting pin, also in detail views a through d.
Figure 8B:
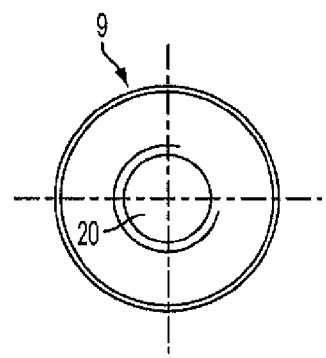
Figure 8C:
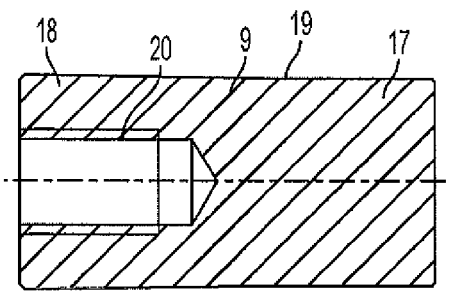
Figure 8D:
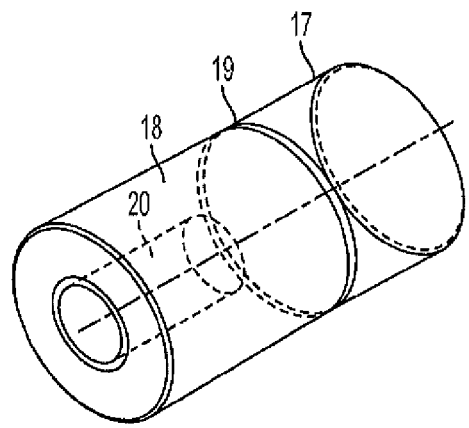
Figure 9A:
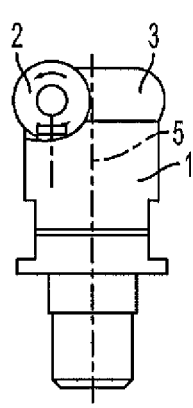
FIG. 9: a further embodiment according to FIG. 1, also in the detail views a through e.
Figure 9B:
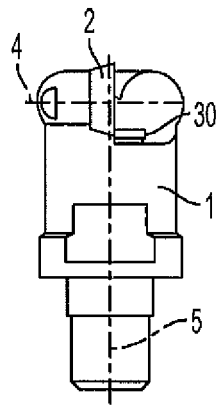
Figure 9C:
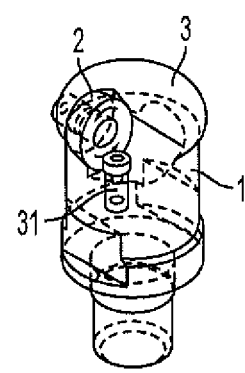
Figure 9D:
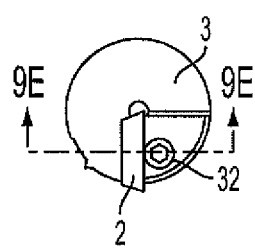
Figure 9E:
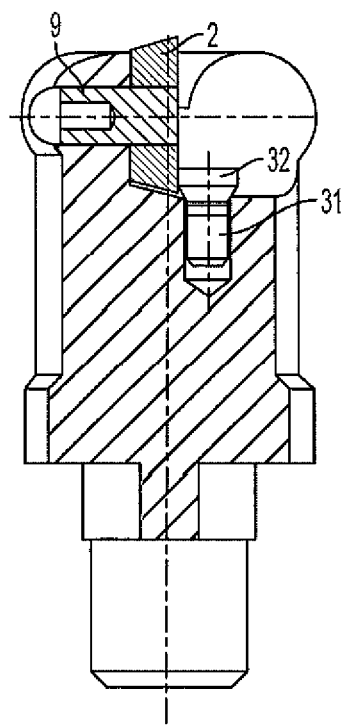

This makes it clear, when considering FIG. 1e, that the indexable cutting insert 2 is held as if in a constraining cage, and that the said cage is determined on the one hand, by the free end 8 of the mounting pin 9 engaging in the central bore 14 of the indexable cutting insert 2, and on the other hand, by the shape determined by the milling cutter material 12, said shape protruding over the rotatably mounted indexable cutting insert 2 from the frontal side 11, in conjunction with the rear support area 15.

As can be seen from the detail view of FIG. 1 e, the mounting pin 9 is disposed in a bore 16 penetrating the milling head 2. The mounting pin 9 per se, as represented in FIG. 1 e and in the component views of FIG. 8 a through d, is equipped with a frontal, cylindrically formed area 17 intended for the rotational mounting of the indexable cutting insert 2. The said cylindrical area 17 thus provides for the indexable cutting insert 2 a kind of sliding mounting whereto the indexable cutting insert 2 is freely rotatably mounted. In the rear area, the mounting pin 9 is equipped with a conically designed area 18 for the fixation in the milling head material 12 of the milling head 3. The mounting pin 9 here can work in conjunction with a conicity provided in the penetrating bore 16 in the rear, conically designed area 18 so that, based on the positive locking connection, the mounting pin 9 forms a rigid axis for the indexable cutting insert 2 due exclusively to adhesion force. A circumferential chamfer 19 here may be provided, in particular, in the transitional area from the conical to the cylindrical area on the mounting pin 9, for example.

It is now easily understood that, when the indexable cutting insert 2, as it is represented in FIG. 1a through 1e, is to be removed from the milling head 3, the mounting pin 9 can be simply pounded and/or pushed out against the conicity so that the mounting pin 9 releases the cylindrical area 17 in the central bore 14 of the indexable cutting insert 2 and the indexable cutting insert 2 can be removed from the cage thereof formed by the milling material 12. When a new indexable cutting insert 2 is to be inserted, the indexable cutting insert 2 can be placed in the free space of the cage, and then the mounting pin 9 only needs to be pounded and/or pushed in again in the direction of the conicity.

The embodiment according to FIG. 2a through e differs only in the way that the mounting pin 9 has a tapped hole 20 in the rear, conical area 18. The said tapped hole 20 can, in particular, be used to connect a removal tool, not shown in the drawing, to the mounting pin 9. It is also conceivable to allow a locking screw or a set-screw to be screwed into the tapped hole 20 thereby bracing the rear area 18 of the mounting pin 9 against the wall of the penetrating bore 16.

FIG. 3a through e shows a variant of an indexable cutting insert 2, where the indexable cutting insert 2 is equipped with a cylindrical pocket hole bore 21 for the rotational mounting. Based on the said design, an indexable cutting insert 2 with a closed frontal side 11 results, as is shown, for example, in FIG. 3a+b. A development of the variant according to FIG. 3 is shown in FIG. 4, where the pocket hole bore 21 is additionally equipped with a central opening 22, where also a tool can be connected, as already described in context with the embodiment of FIG. 1, in order to pound the mounting pin 9 out backwards.

As further possible embodiment, represented in FIG. 5a through e, a milling head 3 is represented, wherein the mounting pin 9 is designed as a screw 23. The frontal area 24 of the shank of the screw 23 here is also shaped cylindrically for the mounting of the indexable cutting insert 2. The cylindrical area 24 then engages in the bore 16, and the rear area 25 of the screw 23 is designed as screw thread so that the screw 23 can be screwed into the bore 16. Here, a collar edge 26 of the cylindrical frontal area 24 presses against a stop 27 in the bore 16 in supporting manner. Thus a rigid axis for the rotatably mounted indexable cutting insert 2 is created in the same way. As can be seen from FIG. 5e, the screw head 28 is designed in such a way that it protrudes over the indexable cutting insert 2 However it is also conceivable, based on the cage embedment, that, for example, not a screw head solution, but a hex socket solution is possible, where then the screw head 28 would be omitted.

The FIGS. 6 and 7 show two embodiments, where the rotation-symmetrically designed Y axis 4 runs on the milling head 3 on a slant. FIG. 6a through e, for example, shows the embodiment wherein the slant has a slight positive inclination in relation to the X axis 6, while FIG. 7a through e represents a slight negative inclination in relation to the X axis 6. For the represented indexable cutting inserts 2 according to FIGS. 6 and 7, it should be said that the indexable cutting insert 2 according to FIG. 7 is equipped with a chip trough 29, while FIG. 6 shows an indexable cutting insert 2 having a chip trough 29 each on the frontal side thereof and on the rear side.

According to a particularly advantageous embodiment of the invention, represented in FIG. 9, instead of being enveloped by the milling cutter material 12, the indexable cutting insert 2 can from its frontal side 11 work in conjunction with a holding element 30. The freely rotatably mounted indexable cutting insert 2, in order to prevent a self-detachment from the mounting pin 9, here is enveloped by the material 12 of the milling head 3, on the one hand on the rear side 10 over the entire surface and on the other hand, from the frontal side 11, by means of a holding element 30 provided on the milling head. The holding element 30 comprises a screw 31 the screw head 32 whereof forms a frontal support area for the rotatably mounted indexable cutting insert 2.

FIGS. 10, 11, 12, and 13 show a further embodiment of a milling tool 1.1 for machining work pieces comprising at least one blade 3.1 disposed on a milling head 2.1, said blade 3.1 being in the form of an indexable cutting insert rotatably mounted on a rotation-symmetrically designed Y axis 4.1 on the milling head 2.1.

The overall view of FIGS. 10 through 13 shows that the Z axis forms the rotational axis 5.1 of the milling tool 1.1, while the X axis occupies the cutting horizon designated by the reference number 6.1. It is now easily understood that the Y axis is provided in a way to run rotation-symmetrically on the milling head 2.1, while the said Y axis 4.1 runs at an offset to the rotational axis 5.1.

As can be seen from the overall view of FIGS. 10 through 13, the indexable cutting insert 3.1 is disposed under a tolerance play 7.1 freely rotatably on the free end 8.1 of a mounting pin 9.1, said mounting pin 9.1 being detachably attached with braced seating to the milling head 2.1. The freely rotatably mounted indexable cutting insert 3.1 here is secured against self-detachment from the mounting pin 9.1 in such a way that the indexable cutting insert 3.1 and the free end 8.1 of the mounting pin 9.1 are secured by means of the positive lock between the free end 8.1 of the mounting pin 9.1 and the mounting seat 10.1 of the indexable cutting insert 3.1. This is particularly clear in the FIGS. 12 and 13, where in particular, the positive lock of the mounting point can be seen here in the form of a sliding mounting. The positive lock between the free end 8.1 of the mounting pin 9.1 and the mounting seat 10.1 of the indexable cutting insert 3.1 here is designed conically. The conical positive lock connection preferably extends over half of the free end 8.1 of the mounting pin 9.1 and/or the mounting seat 10.1 of the indexable cutting insert 3.1.

The free end 8.1 of the mounting pin 9.1 is equipped with a cylindrical area 11.1 for the rotational mounting of the indexable cutting insert 3.1, onto which cylindrical area 11.1 abuts a further conically designed area 12.1 serving the purpose of fixation and centring in the carrier material of the milling head 2.1. If then the mounting pin 9.1 is screwed into the material of the milling head 2.1, in particular, the conical area 11.1 of the mounting pin 9.1 enters into the conicity of the milling head material so that the free end 8.1 of the mounting pin 9.1 is centred here in its rotational axis in the Y axis 4.1.

Figure 12:
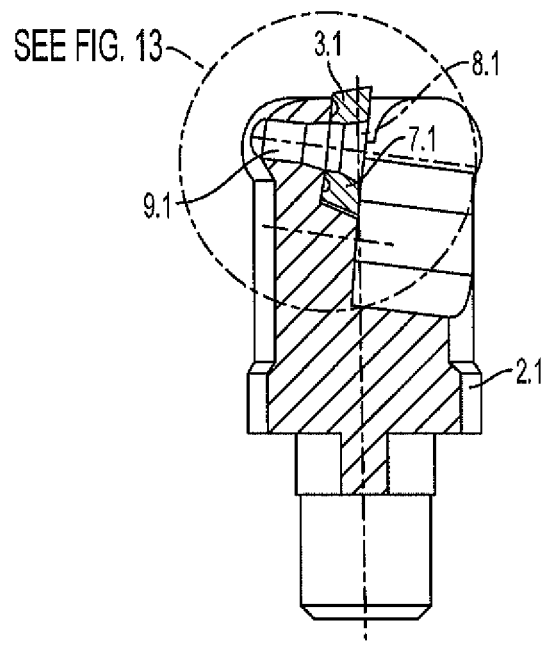
FIG. 12: a sectioned lateral view of the milling cutter according to FIG. 10 along the section line A/A in FIG. 10.
Figure 13:
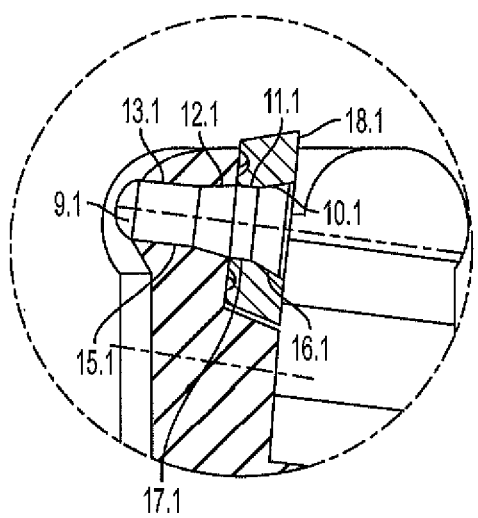
FIG. 13: an exposed detail view, also in sectional representation according to FIG. 12.

As can be seen from FIGS. 12 and 13, the mounting pin 9.1 is in the rear area 13.1 designed as a screw for the bracing fixation in the carrier material of the milling head 2.1. In order to fix the mounting pin 9.1, a hex socket 14.1, for example, here can exist on the frontal face of the mounting pin 9.1, as can be seen, for example, in FIG. 10. With a penetrating bore 15.1 in the milling head material, a hex socket may also, for example, be provided on the rear end of the mounting pin 9.1 so that the mounting pin 9.1 can be detached from the milling head material from the rear side in order to detach and remove the indexable cutting insert 3.1 in this manner.

In order to provide the positive lock connection, the indexable cutting insert 3.1 is, for the rotational mounting, also equipped with a conical bore 16.1 onto which abuts a correspondingly cylindrical area 17.1. According to an advantageous development, the indexable cutting insert 3.1 here is equipped on the frontal side thereof with a chip trough 18.1 so that a controlled chip can be removed by the rotating indexable cutting insert 3.1

Figure 10:
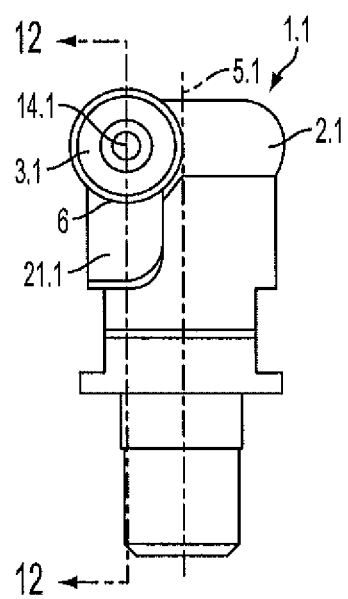
FIG. 10: a further embodiment of a milling tool according to the invention, wherein the milling cutter is represented in a lateral view.
Figure 11:
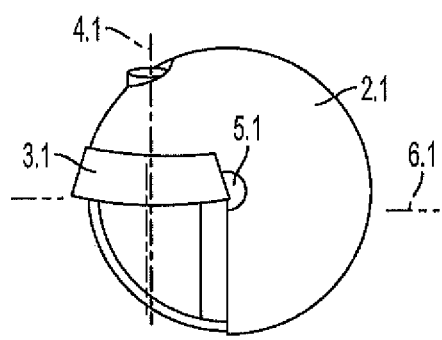
FIG. 11: a top view of the milling cutter according to FIG. 10.
Figure 14:
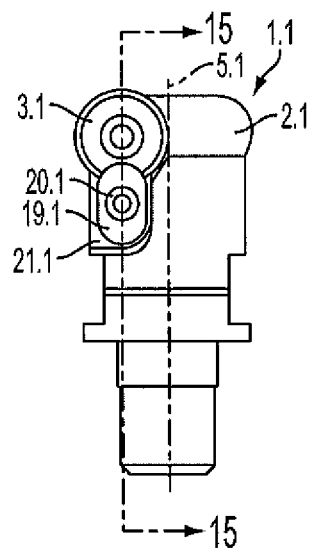
FIG. 14: a further embodiment according to the invention, where the milling cutter is also represented in a lateral view.
Figure 15:
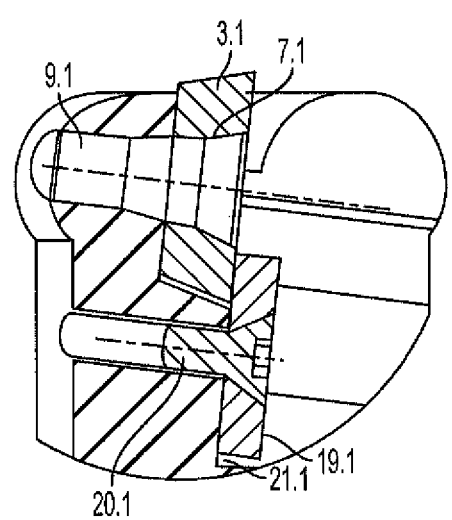
FIG. 15: a further exposed representation in a sectional representation with holding element.

According to a particular embodiment of the invention, represented in the FIGS. 14 and 15, a holding element 19.1 is in addition provided on the frontal side of the indexable cutting insert 3.1, said holding element 19.1 in parts enveloping, in particular, the frontal side of the indexable cutting insert 3.1. In the lower area of the indexable cutting insert 3.1, a cage is formed wherein the freely rotating indexable cutting insert 3.1 is enveloped. The holding element 19.1 comprises a plate attached to the milling head 2.1 by means of a fastening means 20.1, preferably a screw. The plate here can preferably lie or be disposed in a cavity 21.1 provided in the milling head 2.1, for example, such as is represented in FIG. 10. As can be seen from the embodiment of FIGS. 14 and 15, the holding element 19.1, here is designed as a rounded-off plate on the faces, said plate being fixed by means of the fastening means 20.1, preferably a screw. The plate-shaped element protrudes, for example, over parts of the cavity 21.1 so that it protrudes over the indexable cutting insert 3.1 in one area. Thus the indexable cutting insert 3,1 is additionally secured so that a self-detaching process is prevented thereby.

LIST OF REFERENCE NUMBERS

1. milling tool
2. indexable cutting insert 3. milling head
4. Y axis
5. Z axis
6. X axis
7. tolerance play
8. free end
9. mounting pin
10. rear side of indexable cutting insert
11. frontal side of indexable cutting insert
12. milling head material
13. lower section
14. central bore, indexable cutting insert
15. rear support area for indexable cutting insert
16. penetrating bore
17. cylindrical area
18. conical area
19. chamfer
20. tapped hole
21. pocket hole bore
22. central opening
23. screw
24. frontal area
25. rear area
26. collar edge
27. stop
28. screw head
29. chip trough
30. holding element
31. screw
32. screw head
   1.1 milling tool
   2.1 milling head
   3.1 indexable cutting insert
   4.1 Y axis rotational axis of indexable cutting insert
   5.1 Z axis rotational axis
   6.1 X axis cutting horizon
   7.1 tolerance play
   8.1 free end
   9.1 mounting pin
   10.1 mounting seat
   11.1 cylindrical area
   12.1 conical area
   13.1 rear area
   114.1 hex socket
   15.1 bore
   16.1 conical bore
   17.1 cylindrical bore
   18.1 chip trough
   19.1 holding element
   20.1 fastening means, preferably a screw
   21.1 cavity

The invention claimed is:

1. A milling tool comprising: at least one indexable cutting insert that has a rear side and a frontal side and that is radially disposed on the milling head, said indexable cutting insert being rotatably mounted on a mounting pin according to a rotation-symmetrically designed Y axis of said milling head, said mounting pin having a first end that is a free end that includes a frontal cylindrical area for the rotational mounting of the indexable cutting insert, said mounting pin also having a second end that is oppositely disposed from said first end, said second end including a rear, conically shaped area that is disposed in a penetrating bore in the milling head and engages the milling head to rigidly fix the mounting pin in the milling head, said indexable cutting insert being mounted on the free end of said mounting pin and subject to a tolerance play such that said indexable cutting insert is freely rotatable about said rotation-symmetrically designed Y axis of said milling head on the free end of said mounting pin, the second end of said mounting pin being detachably, rigidly fixed within a bore in the milling head to define said rotation-symmetrically designed Y axis of said milling head, such that at times when the second end of said mounting pin is rigidly fixed within the bore in the milling head, the indexable cutting insert is mounted and freely rotatable on the free end of the mounting pin with the milling head opposing the entire surface of the rear side of the indexable cutting insert and also opposing parts of the frontal side of the indexable cutting insert such that the milling head maintains the indexable cutting insert on the free end of the mounting pin; and such that at times when the second end of said mounting pin is detached and removed from the bore of the milling head, the indexable cutting insert is free of the mounting pin and removable from the milling head.

2. A milling tool according to claim 1, wherein the rear, conically shaped area of the mounting pin includes a central tapped hole.

3. A milling tool according to claim 2, wherein the mounting pin cooperates with a conical surface in the bore in the milling head.

4. A milling tool comprising: at least one indexable cutting insert that has a rear side and a frontal side and that is radially disposed on the milling head, said indexable cutting insert being rotatably mounted on a mounting pin according to a rotation-symmetrically designed Y axis of said milling head, said mounting pin having a first end that is a free end and a second end that is oppositely disposed from said first end, said indexable cutting insert being mounted on the free end of said mounting pin and subject to a tolerance play such that said indexable cutting insert is freely rotatable about said rotation-symmetrically designed Y axis of said milling head on the free end of said mounting pin, the second end of said mounting pin being detachably, rigidly fixed within a bore in the milling head to define said rotation-symmetrically designed Y axis of said milling head, such that at times when the second end of said mounting pin is rigidly fixed within the bore in the milling head, the indexable cutting insert is mounted and freely rotatable on the free end of the mounting pin with the milling head opposing the entire surface of the rear side of the indexable cutting insert, and cooperating with a screw having a screw head that forms a frontal side support area for the indexable cutting insert, said screw being fixed to the milling head such that the screw opposes part of the frontal side of the indexable cutting insert to maintain the indexable cutting insert on the free end of the mounting pin; and such that at times when the second end of said mounting pin is detached and removed from the bore of the milling head, the indexable cutting insert is free of the mounting pin and removable from the milling head.

5. A milling tool comprising: at least one indexable cutting insert that has a rear side and a frontal side and that is radially disposed on the milling head, said indexable cutting insert being rotatably mounted on a mounting pin according to a rotation-symmetrically designed Y axis of said milling head, said mounting pin having a first end that is a free end and a second end that is oppositely disposed from said first end, said indexable cutting insert being mounted on the free end of said mounting pin and subject to a tolerance play such that said indexable cutting insert is freely rotatable about said rotation-symmetrically designed Y axis of said milling head on the free end of said mounting pin, the second end of said mounting pin being detachably, rigidly fixed within a bore in the milling head to define said rotation-symmetrically designed Y axis of said milling head, such that at times when the second end of said mounting pin is rigidly fixed within the bore in the milling head, the indexable cutting insert is mounted and freely rotatable on the free end of the mounting pin with the milling head opposing the entire surface of the rear side of the indexable cutting insert and cooperating with a conically shaped positive lock between the free end of the mounting pin and the mounting seat of the indexable cutting insert to maintain the indexable cutting insert on the free end of the mounting pin; and such that at times when the second end of said mounting pin is detached and removed from the bore of the milling head, the indexable cutting insert is free of the mounting pin and removable from the milling head.

6. A milling tool according to claim 5, wherein the positive lock extends over approximately half of the free end of the mounting pin and the mounting seat of the indexable cutting insert.

7. A milling tool according to claim 6, wherein the second end of mounting pin includes a rear area that is shaped as a screw to secure the mounting pin to the milling head.

8. A mounting pin for a milling tool wherein at least one indexable cutting insert is radially disposed on a milling head that includes a bore that defines a conical surface, said indexable cutting insert being rotatably mounted on the mounting pin according to a rotation-symmetrically designed Y axis of said milling head, said mounting pin comprising: a first end that defines a cylindrical surface and a second end that is oppositely disposed on said mounting pin from said first end, said second end defining a conically shaped surface with the direction of conicity being toward the first end of said mounting pin, said mounting pin cooperating with the bore in said milling head such that at times when the mounting pin is moved through the bore in the direction of conicity, the conically shaped surface of said second end engages the conically shaped surface of the bore of said milling head to rigidly fix the second end of the mounting pin within the bore of said milling head with the first end of said mounting pin being a free end on which the indexable cutting insert is freely rotatable, and such that, at times when the mounting pin is moved through the bore against the direction of conicity, the conically shaped surface of said second end is detached from the conically shaped surface of the bore of said milling head to detach the second end of the mounting pin from the milling head.

* * * * *